(12) United States Patent
Guest

(10) Patent No.: US 8,721,958 B2
(45) Date of Patent: May 13, 2014

(54) PERMEABLE MATERIAL COMPACTING METHOD AND APPARATUS

(75) Inventor: Randall V. Guest, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 163 days.

(21) Appl. No.: 13/204,177

(22) Filed: Aug. 5, 2011

(65) Prior Publication Data

US 2013/0032974 A1    Feb. 7, 2013

(51) Int. Cl.
B29C 51/10    (2006.01)

(52) U.S. Cl.
USPC .......................................... 264/571; 264/570

(58) Field of Classification Search
None
See application file for complete search history.

(56) References Cited

U.S. PATENT DOCUMENTS

| | | |
|---|---|---|
| 1,352,493 A | 9/1920 | Wolffgram |
| 3,089,187 A | 5/1963 | Wolfe |
| 3,099,318 A | 7/1963 | Miller et al. |
| 3,205,289 A | 9/1965 | Carpenter |
| 3,371,793 A | 3/1968 | Fowler |
| 3,566,653 A | 3/1971 | Unrath |
| 3,695,076 A | 10/1972 | Kocks |
| 3,892,832 A | 7/1975 | Schey |
| 3,933,557 A | 1/1976 | Pall |
| 4,214,612 A | 7/1980 | de Putter |
| 4,260,096 A | 4/1981 | Samarynov et al. |
| 4,358,064 A | 11/1982 | Garneau |
| 4,363,845 A | 12/1982 | Hartmann |
| 4,474,845 A | 10/1984 | Hagerman et al. |
| 4,518,340 A | 5/1985 | Jakobsen et al. |
| 4,545,947 A | 10/1985 | Bozoarth et al. |
| 4,577,481 A | 3/1986 | Staat |
| 4,592,782 A | 6/1986 | Davies |
| 4,621,999 A | 11/1986 | Gerhardt |
| 4,807,525 A | 2/1989 | de Brock |
| 4,816,106 A | 3/1989 | Turris et al. |
| 4,924,568 A | 5/1990 | Sato et al. |
| 4,976,915 A | 12/1990 | Kuroki |
| 5,032,622 A | 7/1991 | Herrington et al. |
| 5,049,591 A | 9/1991 | Hayashi et al. |
| 5,098,776 A | 3/1992 | Kobayashi et al. |
| 5,120,380 A | 6/1992 | Strachan |
| 5,207,960 A | 5/1993 | Moret de Rocheprise |
| 5,230,726 A | 7/1993 | Smith et al. |
| 5,242,651 A | 9/1993 | Brayden et al. |
| 5,324,117 A | 6/1994 | Matsushita et al. |

(Continued)

FOREIGN PATENT DOCUMENTS

EP    0177167 A1    4/1986
JP    06-047219 A    2/1994

(Continued)

OTHER PUBLICATIONS

Notification of Transmittal of the International Search Report and the Written Opinion of the International Searching Authority; PCT/US2012/041239; Mailed Jan. 2, 2013; Korean Intellectual Property Office; 9 pages.

(Continued)

*Primary Examiner* — Monica Huson
(74) *Attorney, Agent, or Firm* — Cantor Colburn LLP

(57) ABSTRACT

A permeable material compacting method includes, forming a cavity between a membrane and a structure, porting fluid to or from the cavity, positioning permeable material adjacent the membrane, generating a differential pressure across the membrane, deforming the membrane, and decreasing volume of the permeable material.

17 Claims, 2 Drawing Sheets

(56) References Cited

U.S. PATENT DOCUMENTS

| | | | |
|---|---|---|---|
| 5,429,847 | A | 7/1995 | Ando et al. |
| 5,501,832 | A | 3/1996 | Adams |
| 5,503,784 | A | 4/1996 | Balk |
| 5,520,758 | A | 5/1996 | Kelman et al. |
| 5,533,370 | A | 7/1996 | Kuroda et al. |
| 5,565,049 | A | 10/1996 | Simmons et al. |
| 5,770,016 | A | 6/1998 | Greve |
| 5,964,798 | A | 10/1999 | Imran |
| 6,281,289 | B1 | 8/2001 | Maugans et al. |
| 6,302,676 | B1 | 10/2001 | Kato et al. |
| 6,321,503 | B1 | 11/2001 | Warren |
| 6,342,283 | B1 | 1/2002 | Mozelack et al. |
| 6,388,043 | B1 | 5/2002 | Langer et al. |
| 6,472,449 | B1 | 10/2002 | Heinemann et al. |
| 6,521,555 | B1 | 2/2003 | Bodaghi et al. |
| 6,560,942 | B2 | 5/2003 | Warren et al. |
| 6,583,194 | B2 | 6/2003 | Sendijarevic |
| 6,769,484 | B2 | 8/2004 | Longmore |
| 6,817,441 | B2 | 11/2004 | Murakami et al. |
| 6,827,764 | B2 | 12/2004 | Springett et al. |
| 6,935,432 | B2 | 8/2005 | Nguyen |
| 6,983,796 | B2 | 1/2006 | Bayne et al. |
| 6,986,855 | B1 | 1/2006 | Hood et al. |
| 7,048,048 | B2 | 5/2006 | Nguyen et al. |
| 7,134,501 | B2 | 11/2006 | Johnson et al. |
| 7,155,872 | B2 | 1/2007 | Francom |
| 7,234,518 | B2 | 6/2007 | Smith |
| 7,552,767 | B2 | 6/2009 | Wood |
| 7,644,773 | B2 | 1/2010 | Richard |
| 7,677,321 | B2 | 3/2010 | Spray |
| 7,712,529 | B2 | 5/2010 | Dusterhoft et al. |
| 7,743,835 | B2 | 6/2010 | Willauer |
| 7,828,055 | B2 | 11/2010 | Willauer et al. |
| 2002/0144822 | A1 | 10/2002 | Hackworth et al. |
| 2003/0213380 | A1 | 11/2003 | Sebastian et al. |
| 2004/0241410 | A1 | 12/2004 | Fischer et al. |
| 2005/0056425 | A1 | 3/2005 | Grigsby et al. |
| 2005/0126699 | A1 | 6/2005 | Yen et al. |
| 2005/0173130 | A1 | 8/2005 | Richard |
| 2005/0205263 | A1 | 9/2005 | Richard |
| 2005/0272211 | A1 | 12/2005 | Browne et al. |
| 2006/0228963 | A1 | 10/2006 | Souther et al. |
| 2007/0044891 | A1 | 3/2007 | Sellars et al. |
| 2007/0211970 | A1 | 9/2007 | Nagata et al. |
| 2008/0006413 | A1 | 1/2008 | Le Gloahec et al. |
| 2008/0296020 | A1 | 12/2008 | Willauer |
| 2008/0296023 | A1 | 12/2008 | Willauer |
| 2009/0252926 | A1 | 10/2009 | Henderson et al. |
| 2009/0301635 | A1 | 12/2009 | Corre et al. |
| 2009/0319034 | A1 | 12/2009 | Sowinski |
| 2010/0038076 | A1 | 2/2010 | Spray et al. |
| 2010/0144247 | A1 | 6/2010 | Lunn et al. |
| 2011/0178237 | A1 | 7/2011 | Ono et al. |

FOREIGN PATENT DOCUMENTS

| | | |
|---|---|---|
| JP | 6-210318 | 8/1994 |
| JP | 6210309 A | 8/1994 |
| JP | 3279962 B2 | 4/2002 |
| WO | 2004099560 A1 | 11/2004 |
| WO | 2007106429 | 9/2007 |

OTHER PUBLICATIONS

Notification of Transmittal of the International Search Report and the Written Opinion of the International Searching Authority; PCT/US2012/048795; Mailed Feb. 14, 2013; Korean Intellectual Property Office; 10 pages.

Notification of Transmittal of the International Search Report and the Written Opinion of the International Searching Authority; PCT/US2012/048796; Mailed Feb. 8, 2013, Korean Intellectual Property Office; 6 pages.

Notification of Transmittal of the International Search Report and the Written opinion of the International Searching Authority; PCT/US2012/048798; Mailed Feb. 20, 2013, Korean Intellectual Property Office; 8 pages.

J. Heiland et al., "The Role of the Annular Gap in Expandable Sand Screen Completions"; Society of Petroleum Engineers; SPE Paper No. 86463; Feb. 18-20, 2004.

Lorrie A. Krebs et al., "Pitting Resistance of Nitinol Stents Before and After Implantation"; NACE International; Paper No. 09461; Corrosion Conference and Expo Mar. 22-26, 2009.

Witold M. Sokolowski et al., "Cold hibernated elastic memor(yC HEM) self-deployable structures"; Jet Propulsion Laboratory, California Institute of Technology, Mar. 1, 1999.

SPE Distinguished Lecturer Series[online]; retrieved on Sep. 25, 2009]; retrieved from the Internet at: http://www.spe.org/spe-site/spe/spe/events/dl/Ott.pdf.

C.F. Williams et al., "A New Sizing Criterion for Conformable and Nonconformable Sand Screens Based on Uniform Pore Structures"; Society of Petroleum Engineers, SPE Paper No. 98235; Feb. 15-17, 2006.

Notification of Transmittal of the International Search Report and the Written Opinion of the International Searching Authority; PCT/US2012/021273; Korean Intellectual Property Office; Mailed Sep. 26, 2012; 8 pages.

International Search Report and Written Opinion, International Application No. PCT/US2012/021274, Date of Mailing Aug. 17, 2012, Korean Intellectual Property Office, International Search report 5 pages, Written Opinion 7 pages.

Notification of Transmittal of the International Search Report and the Written Opinion of the International Searching Authority, PCT/US2011/031768; Mailed Sep. 30, 2011; Korean Intellectual Property Office.

G. Scott Lester et al., "Field Application of a New Cleanable and Damage Tolerant Downhole Screen,"; Society of Petroleum Engineers, SPE Paper No. 30132, May 15, 1995.

Jiaxing (Jason) Ren et al., "Studying the Effect of Chemical Aging on the Properties of a Shape Memory Material", Offshore Technology Conference, Paper No. OTC 21317; May 2, 2011.

PERMEABLE MATERIAL COMPACTING METHOD AND APPARATUS

BACKGROUND

Gravel packing is a process used in the downhole industry to fill an annulus with gravel. Gravel packed by such a process is permeable to fluid while providing support to walls of a wellbore in an earth formation, for example. The support prevents erosion and other damage to the formation walls that could result if the gravel support were not present. Recent developments replace the gravel pack with permeable space conforming materials that can expand to fill an annulus after being deployed therein. Such materials, as those described in U.S. Pat. No. 7,828,055 granted to Willauer et al. on Nov. 9, 2010, in U.S. Pat. No. 5,049,591 to Kaisha on Sep. 17, 1991 and methods as described in U.S. Pat. No. 7,644,773 to Richard on Jan. 12, 2010, the entire contents of which are incorporated herein by reference, require compaction or compression prior to being deployed. Methods and systems for compacting such materials are well received in the art.

BRIEF DESCRIPTION

Disclosed herein is a permeable material compacting method. The method includes, forming a cavity between a membrane and a structure, porting fluid to or from the cavity, positioning permeable material adjacent the membrane, generating a differential pressure across the membrane, deforming the membrane, and decreasing volume of the permeable material.

Further disclosed herein is a permeable material compacting apparatus. The apparatus includes, a structure, and a membrane in operable communication with the structure defining a cavity therebetween. The membrane is deformable to allow a differential pressure to be built thereacross to cause a volume of the cavity to change, the membrane is also configured such that permeable material positioned adjacent the membrane can be compressed to a smaller volume in response to deformation of the membrane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
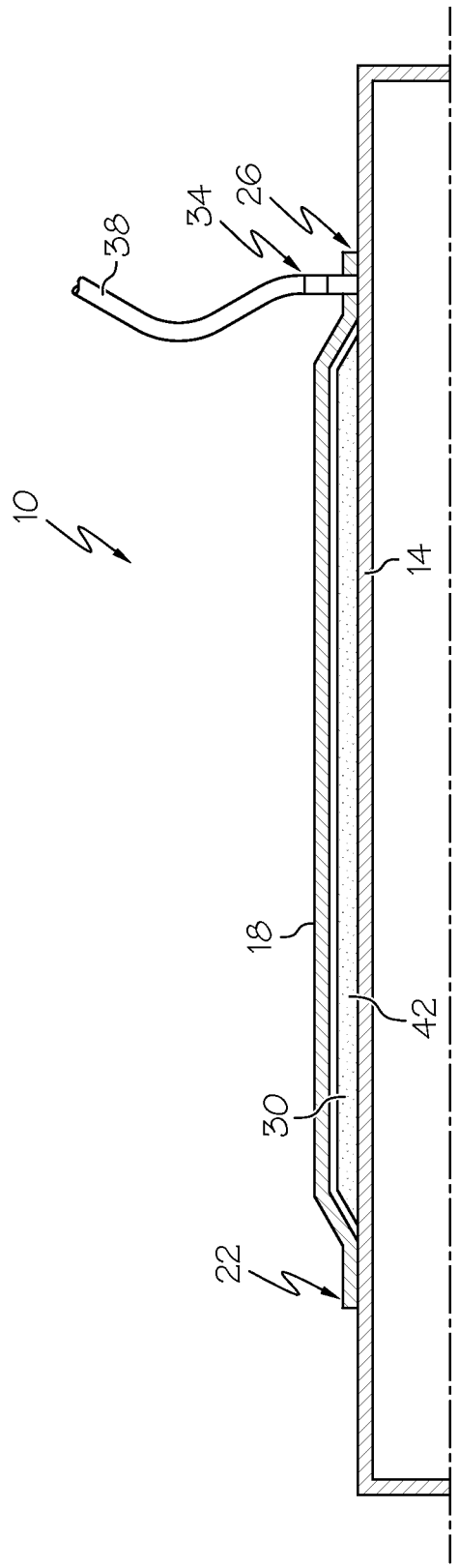
FIG. 1 depicts a partial cross sectional view of a permeable material compacting apparatus disclosed herein.

Referring to FIG. 1, an embodiment of a permeable material compacting apparatus disclosed herein is illustrated at 10. The permeable material compacting apparatus 10 includes a structure 14, shown in this embodiment as a mandrel or tubular, and a membrane 18. The membrane 18 is sealably attached to the structure 14 at ends 22 and 26 defining a cavity 30 between the membrane 18 and the structure 14. A fitting 34 fluidically connects a conduit 38 to the membrane 18 so that fluid can be pumped into and out of the cavity 30. It should be noted that the fitting 34 could alternately be positioned in the structure 14 thereby allowing fluid transfer to and from the cavity 30 through the structure 14. Permeable material 42 placed within the cavity 30 can be compacted in response to a vacuum being pulled in the cavity 30 through the conduit 38 that creates a differential pressure across the membrane 18 and urges the membrane 18 to deform and the volume of the cavity 30 to decrease. Heating the permeable material 42 before compaction and cooling the permeable material 42 after the compaction can aid in increasing the percentage of volume reduction of the permeable material 42 and maintaining it in the reduced volume condition until volumetric expansion is again desired.

It should be understood that the term permeable material as used herein covers any material that could serve as a filter to remove unwanted particulates from fluid passing therethrough. This filtration can be via flow through pores, cells or interstices, for example and as such, materials employable as the permeable material 42 include porous or cellular materials as well as membranes, mats and foams.

Figure 2:
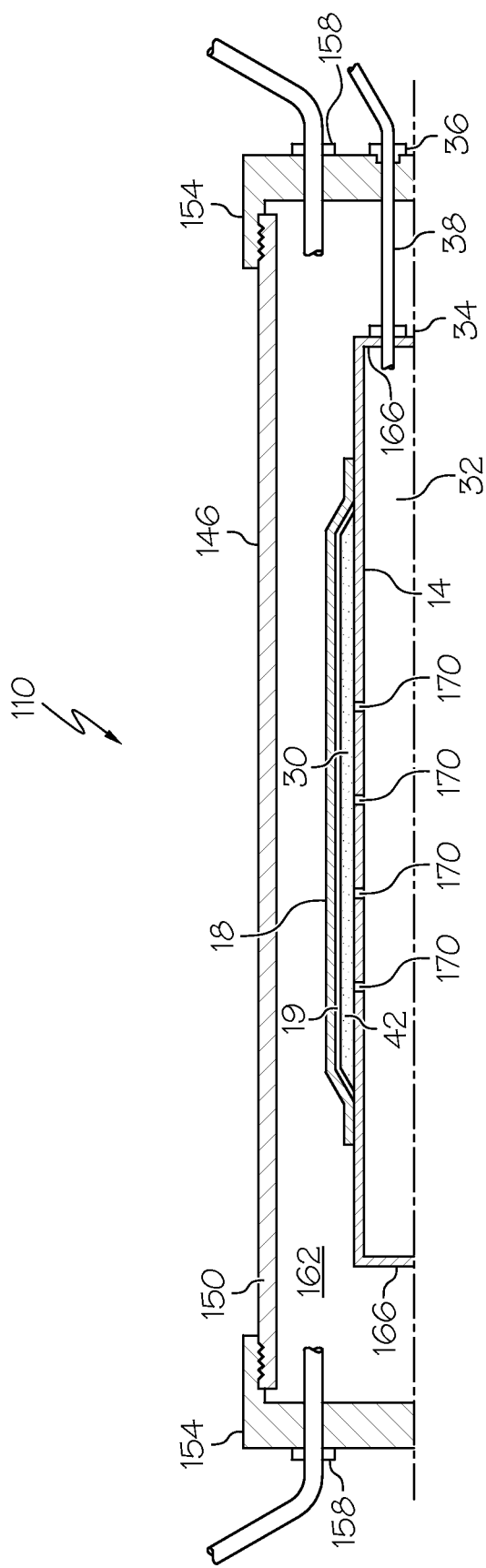
FIG. 2 depicts a partial cross sectional view of an alternate embodiment of a permeable material compacting apparatus disclosed herein.

Referring to FIG. 2, an alternate embodiment of a permeable material compacting apparatus disclosed herein is illustrated at 110. The permeable material compacting apparatus 110 is similar to that of apparatus 10 and as such like elements are identified with the same reference characters. A primary difference between the apparatus 110 and 10 is the addition of an autoclave 146 configured to house at least the permeable material 42, the membrane 18 and the structure 14. The autoclave 146, in this embodiment, includes a cylindrical portion 150 with end caps 154 sealably attached thereto, but may in practice be any pressure vessel structure with appropriate closures. One or more fittings 158 (with two being illustrated) provide fluidic access to a cavity 162 defined between the vessel 146 and the membrane 18 and the structure 14. The structure 14 of this embodiment includes fluid tight end caps 166 with the fitting 34 connecting the conduit 38 through one of the end caps 166. The conduit 38 also sealably extends through the end cap 154 through a fitting 36. The conduit 38 may just as well pass through the wall 150 of the autoclave 146, using fittings or connectors similar to fitting 36, for example. Additionally, one or more ports 170 in the structure 14 provide fluidic communication between the cavity 30 and a cavity 32 and thence to the conduit 38.

The autoclave 146 allows pressure to be built therewithin to assist in or singly provide the differential pressure across the membrane 18 that causes deformation of the membrane 18 and compression or compaction of the permeable material 42. Stated another way, the apparatus 110 can employ one or both of pressure in the cavity 162 and vacuum in the cavity 32 to create the desired pressure differential across the membrane 18. In applications wherein the only pressure is built within the cavity 162, the ports 170 serve as a vent to allow fluid within the cavity 30 to escape when volume of the permeable material 42 is being reduced. This vented fluid from the cavity 30 can flow into the cavity 32 and then to the ambient atmosphere through the conduit 38.

By at least two of the fittings 158 providing fluidic access to the cavity 162, fluid, such as water or oil, for example, at temperatures different than that of the permeable material 42 can be pumped into and out of the vessel 146 to expedite transferring heat to and from the permeable material 42. As such, temperatures of the permeable material 42 can be adjusted before and after creation of differential pressure across the membrane 18 and subsequent compaction of the permeable material 42 takes place. While some materials usable as the permeable material 42 are preferably heated before compaction and cooled after, as discussed above, for other materials the heating and cooling order are reversed. Some high-loft materials, which, as initially assembled, are largely void, such as high-loft fiber mat, for example, in order to serve their purpose downhole must be consolidated or compacted into a more dense layer. Additionally, some materials, while held in the consolidated or compacted arrangement require that the temperature of the fiber be raised to a determined temperature. Such materials are sometimes referred to as heat fusible mats. These materials may be compacted while cold, and then heated to a determined temperature to fuse them.

Additionally, some materials, when placed in the cavity 30 for subsequent compaction, achieve a non-uniform surface configuration, with greatly varying thickness from place to place. This is especially the case when the structure 14 and the permeable material 42 are both cylindrical. One way to improve geometric uniformity during this process is to prepare the permeable material 42 by placing a tension film 19 over the material after installing it on structure 14 and before covering it with the membrane 18. The film 19 material is chosen to provide compressive stress on the permeable material 42 from its initial configuration to its final configuration. In one embodiment, a natural rubber membrane capable of stretching to 3-7 times its initial length is chosen for the film 19 material. The film 19 is wrapped around the permeable material 42 while the film 19 is stretched 3-7 times its initial length. The film 19 is then fixed in position using adhesive tape or other means. The membrane 18 is placed around the film 19 and the process described above is performed. The residual tension in the film 19 influences the permeable material 42 to take a more uniform cylindrical shape in lieu of hills and valleys that tend to form when membrane 18 is used alone.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A permeable material compacting method comprising:
    forming a cavity between a membrane and a structure;
    porting fluid to or from the cavity;
    positioning permeable material adjacent the membrane;
    positioning the permeable material around a tubular or mandrel;
    generating a differential pressure across the membrane;
    deforming the membrane; and
    decreasing volume of the permeable material.

2. The permeable material compacting method of claim 1, further comprising:
    positioning the permeable material within a vessel; and
    defining the cavity as being within the vessel on a side of the membrane opposite a side on which the permeable material is located.

3. The permeable material compacting method of claim 2, further comprising pumping liquid into the vessel.

4. The permeable material compacting method of claim 3, wherein the liquid includes water.

5. The permeable material compacting method of claim 3, wherein the liquid is at a different temperature than the permeable material to expedite transferring heat to or from the permeable material.

6. The permeable material compacting method of claim 2, further comprising venting fluid from within the permeable material during the decreasing of volume.

7. The permeable material compacting method of claim 1, further comprising heating the permeable material prior to decreasing volume thereof.

8. The permeable material compacting method of claim 1, further comprising cooling the permeable material subsequent to decreasing volume thereof.

9. The permeable material compacting method of claim 1, further comprising heating the permeable material subsequent to decreasing volume thereof.

10. The permeable material compacting method of claim 1, wherein the increasing differential pressure includes pulling a vacuum within the cavity.

11. The permeable material compacting method of claim 1, further comprising increasing pressure on one side of the membrane and decreasing pressure on the other side of the membrane.

12. The permeable material compacting method of claim 1, further comprising wrapping the permeable material in a film configured to remain in tension throughout a full range of the decreasing of volume of the permeable material.

13. A method of compacting permeable material comprising:
    positioning permeable material around a tubular or mandrel;
    positioning a membrane around the permeable material;
    sealing the membrane to the tubular or mandrel;
    pulling a vacuum on a cavity defined between the tubular or mandrel and the membrane; and
    radially reducing dimensions of the permeable material.

14. The method of compacting permeable material of claim 13, further comprising deforming the membrane.

15. The method of compacting permeable material of claim 13, further comprising decreasing volume of the permeable material.

16. The method of compacting permeable material of claim 13, further comprising compacting the permeable material.

17. The method of compacting permeable material of claim 13, further comprising radially reducing the maximum radial dimensions of the permeable material.

* * * * *